3,324,043
ANTI-OXIDANT COMPOSITIONS AND PROCESS
Jack K. Krum, New Canaan, Conn., assignor to Sterling Drug Inc., New York, N.Y., a corporation of Delaware
No Drawing. Filed Oct. 19, 1964, Ser. No. 404,957
24 Claims. (Cl. 252—401)

This invention relates to a process for using compositions of matter classified in the art of chemistry as hydroxylated N-alkylamines.

The invention sought to be patented, in its process aspect, is described as residing in the concept of using the tangible embodiment of a composition of matter containing a chemical compound having a molecular structure in which there is attached, to the nitrogen atom of an N-[(2-hydroxy-1-hydroxy-methyl-1-lower-alkyl) ethyl]amine, N-[(2-hydroxy - 1,1 - bis-hydroxy-methyl) ethyl]amine, or N-[(2-hydroxy-1,1-di-lower-alkyl)ethyl] amine, hereinafter referred to as an N-[(2-hydroxy-1,1-di-substituted)ethyl]amine, at least one alkyl group, said compound having a total of between fourteen and twenty-eight carbon atoms, inclusive, by incorporating such composition as an antioxidant ingredient for the purpose of preventing oxidation in materials subject to deterioration through oxidation.

The hydroxylated secondary and tertiary amines useful in practicing my invention are represented by the following structural formula:

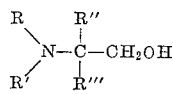

wherein R represents a hydrogen atom or lower-alkyl radical, R' represents an alkyl radical of from ten to eighteen carbon atoms, R" and R''' each represent a lower-alkyl or hydroxymethyl radical, and the sum of the number of carbon atoms in R, R', R", and R''' is between thirteen and twenty-six, inclusive. The compounds of the invention thus can also be represented by the formulas

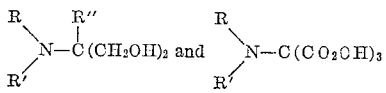

wherein R, R', and R" have the meanings given above.

The exact nature of the alkyl radicals represented by R, R', R", and R''' is not critical, the only critical feature being the total carbon content of the molecule. Thus R', as an alkyl radical, can be any of such straight chain or branched chain groups as decyl, 3-methyldecyl, undecyl, dodecyl, tridecyl, tetradecyl, hexadecyl, octadecyl, and the like. R, in representing a lower-alkyl radical, preferably has from one to about four carbon atoms, and R" and R''' in representing lower-alkyl, preferably has from one to two carbon atoms. Thus R can be any of such radicals as methyl, ethyl, propyl, isopropyl, butyl, isobutyl, and the like, while R" and R''' can be methyl or ethyl. A particularly preferred class of compounds are those in which R, when lower-alkyl, represents the methyl radical, and R" is hydroxymethyl or, when lower-alkyl, the methyl radical.

The manner and process of making and using the invention will now be generally described, so as to enable a person skilled in the art of chemistry to make and use the same, as follows:

The aforesaid compounds of Formula I where R is hydrogen can be prepared by direct alkylation of an N-[(2-hydroxy-1,1-disubstituted)ethyl]amine. The latter is heated with an alkyl ester, R'X, where X is the anion of a strong acid, in the presence of an acid-acceptor. The anion, X, is one derived from a strong mineral acid, including such anions as chloride, bromide, iodide, nitrate, sulfate, phosphate, and the like, or strong organic acids, including such anions as methanesulfonate, benzenesulfonate, and the like. The halides are preferred anions.

The acid-acceptor can be any basic substance which will neutralize the acid, HX, that is split out during the course of the reaction, and which will not otherwise interfere with the reaction. Inorganic bases, such as the alkali and alkaline earth metal hydroxides, carbonates and bicarbonates can be used. Preferred acid-acceptors are the alkali metal carbonates, viz. sodium carbonate or potassium carbonate.

A preferred method of preparing the secondary amines, R'NH—C(R")(R''')CH$_2$OH, comprises reacting an N-[(2-hydroxy-1,1-disubstituted)ethyl]amine with between about one-third and one-half molar equivalent of the alkyl ester, R'X. In this instance the excess starting amine acts as the acid-acceptor.

A method for preparing the tertiary amines of Formula I (R is lower-alkyl) comprises reacting the secondary amines, R'NH—C(R")(R''')CH$_2$OH, so-formed with a lower-alkyl ester, RX, under the same conditions described above.

Although the reaction can be conducted in the absence of a diluent, it is preferred to employ suitable chemically inert solvents, for example lower-alkanols, as reaction media. Appreciable quantities of water are to be avoided in order to prevent hydrolysis of the alkyl or lower-alkyl ester. The reaction mixture is heated at a temperature between about 50° and 200° C., conveniently at the reflux temperature of the inert solvent.

The practice of the invention contemplates using the compounds of Formula I both in the free base form and in the form of oil-soluble acid-addition salts, and the latter are considered to be the full equivalent of the former. The compounds of Formula I, in the free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid-addition salt. Thus the novel bases and all of their acid-addition salts are readily interconvertible.

The anti-oxidant activity of the compounds of Formula I can be enjoyed in useful form by employing the free bases themselves or the oil-soluble acid-addition salts thereof. The novel feature of the compounds used in the invention, then, resides in the concept of the bases and cationic oil-soluble acid-addition salts thereof and not in any particular acid moiety or acid anion associated with the salt forms of the compounds; rather, the acid moieties or anions which can be associated in the salt forms are in themselves neither novel nor critical and therefore can be any oil-soluble acid anion or oil-soluble acid-like substance capable of salt formation with the bases.

Thus the acid-addition salts discussed above can be prepared from such acids as lauric acid, sebacic acid, oleic acid, stearic acid, capric acid, myristic acid, palmitic acid, arachidic acid, and the like.

The oil-soluble acid-addition salts are prepared either by dissolving the free base in a suitable organic solvent containing the appropriate acid and isolating the salt by evaporating the solution or by allowing the salt to crystallize out directly.

The structures of the compounds used in the practice of the invention are established by the mode of synthesis and corroborated by the correspondence between calculated values for the elements and values found by chemical analysis.

The following examples will further illustrate the invention without being limited thereto.

EXAMPLE 1

*N-(n-dodecyl)-N-[(2-hydroxy-1-hydroxymethyl-1-methyl)ethyl]amine*

[I: R is H; R' is $CH_3(CH_2)_{11}$; R" is $CH_3$; R''' is $CH_2HO$]

A mixture of 52.26 g. (0.20 mole) of n-dodecyl bromide and 52.5 g. (0.50 mole) of N-[(2-hydroxy-1-hydroxymethyl-1-methyl)ethyl]amine in 500 ml. of n-butanol was refluxed for seventy-two hours. The reaction mixture was concentrated in vacuo, the residual oil was poured into two liters of cold water, and the solid which separated was collected, dried, and recrystallized once from ethanol and twice from acetone to give 24.75 g. of N-(n-dodecyl)-N-[(2-hydroxy-1-hydroxymethyl-1-methyl)ethyl]amine. M.P. 50.8–53.6° C. (corr.).

was distilled in vacuo, the fraction boiling at 147–152° C./0.0025 mm. being collected as product. There was thus obtained 21.4 g. of N-(n-dodecyl)-N-methyl-N-[(2-hydroxy-1-hydroxymethyl-1-ethyl)ethyl]amine, $$n_D^{25} = 1.4686$$

EXAMPLES 3–58

The following compounds of Formula I listed below in Table 1 can be prepared from an appropriate alkyl halide and N-[(2-hydroxy-1,1-disubstituted)ethyl]amine (to prepare the secondary amines where R is H) using the manipulative procedure described above in Example 1 or from an appropriate lower-alkyl halide and N-alkyl-N-[(2-hydroxy-1,1-disubstituted)ethyl]amine either using the manipulative procedure described above in Example 2 or by other procedures well-known to those skilled in the art of chemistry (to prepare the tertiary amines where R is lower-alkyl and R' is alkyl). R''' in each case is $CH_2OH$.

TABLE 1

| Example | R | R' | R" | M.P. (or B.P.) | Crystd. from— |
|---|---|---|---|---|---|
| 3 | H | $CH_3(CH_2)_9$ | $C_2H_5$ | 135–144.5° C./0.0005 mm. $n_D^{25}=1.4692$ | |
| 4 | H | $CH_3(CH_2)_{11}$ | $C_2H_5$ | 32.4–33.2° C | Acetone. |
| 5 | H | $CH_3(CH_2)_9$ | $CH_3$ | 45.6–48.2° C | Hexane. |
| 6 | H | $CH_3(CH_2)_{13}$ | $CH_3$ | 55.4–57.6° C | Acetone. |
| 7 | H | $CH_3(CH_2)_{13}$ | $C_2H_5$ | 42.6–43.8° C | Do. |
| 8 | H | $CH_3(CH_2)_{15}$ | $CH_3$ | 62.2–64.4° C | Ethanol. |
| 9 | H | $CH_3(CH_2)_{15}$ | $C_2H_5$ | 48.8–50.0° C | Acetone. |
| 10 | H | $CH_3(CH_2)_{17}$ | $CH_3$ | 67.7–70.1° C | Methanol-acetone. |
| 11 | $C_2H_5$ | $CH_3(CH_2)_{11}$ | $CH_3$ | 134° C./0.0001 mm | |
| 12 | $C_2H_5$ | $CH_3(CH_2)_9$ | $CH_3$ | 82.4–84.0° C. a | Acetone. |
| 13 | $C_2H_5$ | $CH_3(CH_2)_{13}$ | $CH_3$ | 30.3–32.7° C | Ethyl acetate. |
| 14 | $C_2H_5$ | $CH_3(CH_2)_{15}$ | $CH_3$ | 40.0–41.8° C | Do. |
| 15 | $C_2H_5$ | $CH_3(CH_2)_{17}$ | $CH_3$ | 46.4–49.0° C | Do. |
| 16 | $CH_3$ | $CH_3(CH_2)_{11}$ | $CH_3$ | 56.6–58.8° C | Methanol. |
| 17 | $CH_3(CH_2)_2$ | $CH_3(CH_2)_9$ | $C_2H_5$ | 125–137° C./0.005 mm. $n_D^{25}=1.4680$ | |
| 18 | $CH_3(CH_2)_3$ | $CH_3(CH_2)_9$ | $C_2H_5$ | 124–130° C./0.0002 mm. $n_D^{25}=1.4678$ | |
| 19 | $CH_3(CH_2)_4$ | $CH_3(CH_2)_9$ | $C_2H_5$ | 130–133° C./0.003 mm. $n_D^{25}=1.4661$ | |
| 20 | $CH_3(CH_2)_2$ | $CH_3(CH_2)_{11}$ | $CH_3$ | 146–8° C./0.0005 mm. $n_D^{25}=1.4660$ | |
| 21 | $CH_3(CH_2)_3$ | $CH_3(CH_2)_{11}$ | $CH_3$ | 149–160° C./0.0006 mm. $n_D^{25}=1.4658$ | |
| 22 | $CH_3(CH_2)_2$ | $CH_3(CH_2)_{11}$ | $C_2H_5$ | 140–154° C./0.0015 mm. $n_D^{25}=1.4679$ | |
| 23 | $CH_3(CH_2)_3$ | $CH_3(CH_2)_{11}$ | $C_2H_5$ | 152–157° C./0.0002 mm. $n_D^{25}=1.4680$ | |
| 24 | $CH_3$ | $CH_3(CH_2)_{13}$ | $CH_3$ | 159.8–161.2° C | Methanol. |
| 25 | $CH_3(CH_2)_2$ | $CH_3(CH_2)_{13}$ | $CH_3$ | 135–142° C./0.0002 mm. $n_D^{25}=1.4667$ | |
| 26 | $CH_3(CH_2)_3$ | $CH_3(CH_2)_{13}$ | $CH_3$ | 150–155° C./0.0003 mm. $n_D^{25}=1.4662$ | |
| 27 | $CH_3$ | $CH_3(CH_2)_{13}$ | $C_2H_5$ | 51.8–53.8° C | Acetone. |
| 28 | $C_2H_5$ | $CH_3(CH_2)_{13}$ | $C_2H_5$ | 160–166° C./0.002 mm. $n_D^{25}=1.4690$ | |
| 29 | $CH_3(CH_2)_2$ | $CH_3(CH_2)_{13}$ | $C_2H_5$ | 145–152° C./0.0005 mm. $n_D^{25}=1.4682$ | |
| 30 | $CH_3(CH_2)_3$ | $CH_3(CH_2)_{13}$ | $C_2H_5$ | 133–7° C./0.0003 mm. $n_D^{25}=1.4675$ | Do. |
| 31 | $CH_3$ | $CH_3(CH_2)_{15}$ | $C_2H_5$ | 58.2–60.2° C | |
| 32 | $C_2H_5$ | $CH_3(CH_2)_{11}$ | $C_2H_5$ | 145–152° C./0.0002 mm. $n_D^{25}=1.4679$ | Ethyl acetate. |
| 33 | $CH_3$ | $CH_3(CH_2)_{17}$ | $CH_3$ | 67.0–68.0° C | |
| 34 | H | $CH_3(CH_2)_9$ | $CH_2OH$ | 86.8–88.8° C | Acetone. |
| 35 | H | $CH_3(CH_2)_{11}$ | $CH_2OH$ | 92.0–95.2° C | Ethanol. |
| 36 | H | $CH_3(CH_2)_{13}$ | $CH_2OH$ | 92.4–95.2° C | Do. |
| 37 | H | $CH_3(CH_2)_{15}$ | $CH_2OH$ | 90.0–93.8° C | Do. |
| 38 | H | $CH_3(CH_2)_{17}$ | $CH_2OH$ | 95.5–97.1° C | Acetone-methanol. |
| 39 | $CH_3$ | $CH_3(CH_2)_9$ | $CH_2OH$ | 98.2–99.2° C | Ethyl acetate. |
| 40 | $CH_3$ | $CH_3(CH_2)_{11}$ | $CH_2OH$ | 100.0–100.8° C | Methanol. |
| 41 | $CH_3$ | $CH_3(CH_2)_{13}$ | $CH_2OH$ | 97.8–98.8° C | Acetone. |
| 42 | $CH_3$ | $CH_3(CH_2)_{15}$ | $CH_2OH$ | 97.0–99.8° C | Methanol. |
| 43 | $CH_3$ | $CH_3(CH_2)_{17}$ | $CH_2OH$ | 96.2–98.4° C | Acetone. |
| 44 | $C_2H_5$ | $CH_3(CH_2)_9$ | $CH_2OH$ | 40.0–41.0° C | Hexane. |
| 45 | $C_2H_5$ | $CH_3(CH_2)_{11}$ | $CH_2OH$ | 47.4–50.2° C | Acetone. |
| 46 | $C_2H_5$ | $CH_3(CH_2)_{13}$ | $CH_2OH$ | 55.0–56.6° C | Do. |
| 47 | $C_2H_5$ | $CH_3(CH_2)_{15}$ | $CH_2OH$ | 57.2–61.2° C | Do. |
| 48 | $C_2H_5$ | $CH_3(CH_2)_{17}$ | $CH_2OH$ | 64.6–67.0° C | Ethyl acetate. |
| 49 | $CH_3(CH_2)_2$ | $CH_3(CH_2)_9$ | $CH_2OH$ | 91.6–97.0° C. a | Acetone. |
| 50 | $CH_3(CH_2)_2$ | $CH_3(CH_2)_{11}$ | $CH_2OH$ | 50.4–53.2° C | Do. |
| 51 | $(CH_3)_2CH$ | $CH_3(CH_2)_{11}$ | $CH_2OH$ | 70.0–71.6° C | Methanol. |
| 52 | $CH_3(CH_2)_3$ | $CH_3(CH_2)_9$ | $CH_2OH$ | 65.4–68.4° C. a | Ethyl acetate. |
| 53 | $CH_3(CH_2)_3$ | $CH_3(CH_2)_{11}$ | $CH_2OH$ | 41.0–45.4° C | Pentane. |
| 54 | $CH_3(CH_2)_3$ | $CH_3(CH_2)_{13}$ | $CH_2OH$ | 48.4–50.2° C | Do. |
| 55 | $CH_3(CH_2)_4$ | $CH_3(CH_2)_9$ | $CH_2OH$ | Pale yellow oil | |
| 56 | $CH_3(CH_2)_4$ | $CH_3(CH_2)_{11}$ | $CH_2OH$ | do | |
| 57 | $CH_3(CH_2)_9$ | $CH_3(CH_2)_9$ | $CH_2OH$ | 41.2–44.0° C | Acetone. |
| 58 | $CH_3$ | $CH_3(CH_2)_{11}$ | $CH_2OH$ | 91.8–92.6° C. b | Do. | a Hydrochloride salt.
b Laurate salt.

EXAMPLE 2

*N-(n-dodecyl)-N-methyl-N-[(2-hydroxy-1-hydroxymethyl-1-ethyl)ethyl]amine*

[I: R is $CH_3$; R' is $CH_3(CH_2)_{11}$; R" is $C_2H_5$; R''' is $CH_2OH$]

A mixture of 34.8 g. (0.125 mole) of N-(n-dodecyl)-N-[(2-hydroxy-1-hydroxymethyl-1-ethyl)ethyl]amine, 21.3 g. (0.15 mole) of methyl iodide, and 25.0 g. (0.25 mole) of potassium bicarbonate in 75 ml. of absolute ethanol was heated under reflux for twenty-four hours. The insoluble inorganic material was removed by filtration the filtrate was taken to dryness, and the residual oil

EXAMPLE 9

*N-(n-dodecyl)-N-methyl-N-[(2-hydroxy-1,1-dimethyl)ethyl]amine*

[I: R, R", and R''' are $CH_3$; R' is $CH_3(CH_2)_{11}$]

A mixture of 25.7 g. (0.10 mole) of N-(n-dodecyl)-N-[(2-hydroxy-1,1-dimethyl)ethyl]amine and 3.6 g. (0.12 mole) of paraformaldehyde in 250 ml. of benzene was heated under reflux for about an hour and a half while collecting the water produced in the reaction in a water separator. The mixture was then taken to dryness, and the residual oil was distilled in vacuo, the fraction boiling at 85–103° C./0.005 mm. being collected as product. There was thus obtained 24.8 g. of 3-dodecyl-4,4-dimethyloxazolidine.

The latter (19.8 g., 0.07 mole) was dissolved in 130 ml. of absolute ethanol and reduced with hydrogen over 2.0 g. of a ten percent palladium-on-charcoal catalyst under a hydrogen pressure of 1315 pounds p.s.i. at a temperature of from 59° C. to 108° C. When reduction was complete, the catalyst was removed by filtration, the filtrate was taken to dryness, and the residue was distilled in vacuo, the fraction boiling at 106–110° C./0.004 mm. being collected as product. The latter was converted to the hydrochloride salt which was recrystallized from ethanol-ether. The base was regenerated from the latter and the base recrystallized from acetone giving 4.4 g. of N-(n-dodecyl)-N-methyl-N-[(2-hydroxy-1,1-dimethyl) ethyl]amine, M.P. 55.8–57.2° C.

The compounds are prepared for use by dissolving or suspending the compounds either in their free base form or in the form of an oil-soluble acid-addition salt in the material to be protected from oxidation.

The anti-oxidant activity of the compounds was determined by heating a series of 5.0 g. samples of 0.02% (w./w.) solutions of the test compounds in safflower oil at 60° C. in a constant temperature oven for extended periods of time. At various time intervals, a 5.0 g. sample was withdrawn, shaken with 30 ml. of a 60%–40% (v./v.) solution of glacial acetic acid and chloroform and 1 ml. of saturated potassium iodide solution, while protecting the mixture from light, shaken again with 100 ml. of water, and titrated with standard sodium thiosulfate solution. The peroxide value, an expression of the extent of oxidation of the substrate safflower oil, was expressed as the volume in milliliters of 0.01 N sodium thiosulfate required to discharge the iodine color. In each case a control was run in a simultaneous test to determine the peroxide value of untreated safflower oil substrate.

The anti-oxidant activities of a number of representative compounds thus-obtained are given below in Table 2. The activities are expressed in terms of the ratio of the peroxide value for the untreated substrate control at a given time interval to the corresponding peroxide value for the test compound at the same time interval. It will be apparent that the magnitude of the ratio gives a measure of the anti-oxidant effectiveness of the compounds, a higher ratio indicating greater effectiveness. For purposes of comparison the corresponding activity for butylated hydroxy toluene (BHT or 2,6-di-tert.-butyl-p-cresol), one of the commercial anti-oxidants-of-choice, is also included. The example numbers correspond to the examples above where the preparation of the compounds is described.

TABLE 2

| Example | P.V. (control)/ P.V. (cpd.) | Time, hours |
|---|---|---|
| BHT | 1.4 | 283 |
| 10 | 1.0 | 273 |
| 11 | 2.1 | 223 |
| 13 | 4.0 | 188 |
| 15 | 0.9 | 273 |
| 16 | 9.8 | 283 |
| 33 | 3.6 | 223 |
| 35 | 1.0 | 273 |
| 36 | ¹ 1.1 | 168 |
| 37 | 1.0 | 273 |
| 38 | 3.4 | 273 |
| 39 | 8.0 | 216 |
| 40 | 8.4 | 283 |
| 41 | 3.8 | 273 |
| 42 | 3.7 | 283 |
| 43 | 5.4 | 273 |
| 44 | 3.7 | 168 |
| 45 | 2.5 | 273 |
| 46 | 5.6 | 216 |
| 48 | 1.9 | 273 |
| 50 | 2.5 | 262 |
| 51 | 1.3 | 223 |
| 53 | 2.0 | 223 |
| 56 | 1.6 | 216 |
| 58 | 5.0 | 288 |
| 59 | 2.1 | 240 |

¹ Test compound concentration=0.01%.

Applications of the preparations include use as anti-oxidants in animal and vegetable oils, petroleum products, synthetic rubbers, plastics, food, and soaps. The hydroxylated N-alkylamine used as the anti-oxidant is incorporated in the material to be protected at a concentration effective to prevent oxidative deterioration in minor amounts which can be readily determined by trial but which is ordinarily at least about 0.01%. Obviously much larger amounts than required for anti-oxidant effectiveness offer no real advantage.

The subject matter which I regard as my invention is particularly pointed out and distinctly claimed as follows:

1. A process for preventing oxidation in materials subject to deterioration through oxidation which comprises incorporating in such materials in anti-oxidatively effective amount an N - alkylated-N-[(2 -hydroxy-1-hydroxymethyl-1-lower-alkyl)ethyl]amine wherein the total number of carbon atoms in the compound is between fourteen and twenty-eight, inclusive.

2. A process for preventing oxidation in materials subject to deterioration through oxidation which comprises incorporating in such materials in anti-oxidatively effective amount an N - alkylated - N - [(2 - hydroxy-1,1 - bis-hydroxymethyl)ethyl]amine wherein the total number of carbon atoms in the compound is between fourteen and twenty-eight, inclusive.

3. A process for preventing oxidation in materials subject to deterioration through oxidation which comprises incorporating in such materials in anti-oxidatively effective amount an N-alkylated-N-[(2-hydroxy-1,1-di-lower-alkyl)ethyl]amine wherein the total number of carbon atoms in the compound is between fourteen and twenty-eight, inclusive.

4. A process for preventing oxidation in materials subject to deterioration through oxidation which comprises incorporating in such materials in anti-oxidatively effective amount a compound of the formula:

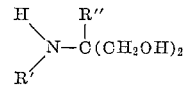

where R' represents alkyl, R'' represents lower-alkyl, and the sum of the number of carbon atoms in R' and R'' is between eleven and twenty, inclusive.

5. A process for preventing oxidation in materials subject to deterioration through oxidation which comprises incorporating in such materials in anti-oxidatively effective amount a compound of the formula:

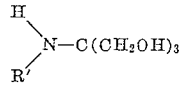

where R' represents alkyl containing from ten to eighteen carbon atoms, inclusive.

6. A process for preventing oxidation in materials subject to deterioration through oxidation which comprises incorporating in such materials in anti-oxidatively effective amount a compound of the formula:

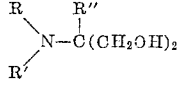

where R' represents alkyl, R and R'' represent lower-alkyl, and the sum of the number of carbon atoms in R, R', and R'' is between twelve and twenty-four, inclusive.

7. A process for preventing oxidation in materials subject to deterioration through oxidation which comprises incorporating in such materials in anti-oxidatively effective amount a compound of the formula:

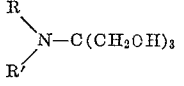

where R represents lower-alkyl, R' represent alkyl, and the sum of the number of carbon atoms in R and R' is between eleven and twenty-two, inclusive.

8. A process for preventing oxidation in materials subject to deterioration through oxidation which comprises incorporating in such materials in anti-oxidatively effective amount a compound of the formula:

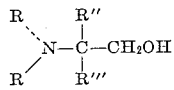

wherein R' represents alkyl, R, R'', and R''' represent lower-alkyl, and the sum of the number of carbon atoms in R, R', R'', and R''' is between thirteen and twenty-six, inclusive.

9. A process for preventing oxidation in materials subject to oxidation which comprises incorporating in such materials in anti-oxidatively effective amount N-(dodecyl)-N - methyl - N - [(2 - hydroxy - 1 - hydroxymethyl - 1-methyl)ethyl]amine.

10. A process for preventing oxidation in materials subject to oxidation which comprises incorporating in such materials in anti-oxidatively effective amount N-(n-tetradecyl) - N - ethyl - N - [(2 - hydroxy - 1 - hydroxymethyl-1-methyl)ethyl]amine.

11. A process for preventing oxidation in materials subject to oxidation which comprises incorporating in such materials in anti-oxidatively effective amount N-(n-decyl) - N - methyl - N - [(2 - hydroxy - 1,1 - bis - hydroxymethyl)ethyl]amine.

12. A process for preventing oxidation in materials subject to oxidation which comprises incorporating in such materials in anti-oxidatively effective amount N-(n-dodecyl) - N - methyl - N - [(2 - hydroxy - 1,1 - bis - hydroxymethyl)ethyl]amine.

13. A process for preventing oxidation in materials subject to oxidation which comprises incorporating in such materials in anti-oxidatively effective amount N-(n-octadecyl) - N - methyl - N - [(2 - hydroxy - 1,1 - bis - hydroxymethyl)ethyl]amine.

14. A process for preventing oxidation in materials subject to oxidation which comprises incorporating in such materials in anti-oxidatively effective amount N-(n-tetradecyl) - N - ethyl - N - [(2 - hydroxy - 1,1 - bis - hydroxymethyl)ethyl]amine.

15. A process for preventing oxidation in materials subject to deterioration through oxidation which comprises incorporating in such materials in anti-oxidatively effective amount an hydroxylated-N-alkylated amine of the formula:

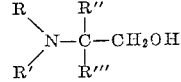

where R represents hydrogen or lower-alkyl, R' represents alkyl containing from ten to eighteen carbon atoms, R'' and R''' each represent lower-alkyl or hydroxymethyl, and the sum of the number of carbon atoms in R, R', R'', and R''' is between thirteen and twenty-six, inclusive.

16. A process for preventing oxidation in materials subject to oxidation which comprises incorporating in such materials in anti-oxidatively effective amount N-(n-tetradecyl) - N - methyl - N - [(2 - hydroxy - 1 - hydroxy-methyl-1-methyl)ethyl]amine.

17. A process for preventing oxidation in materials subject to oxidation which comprises incorporating in such materials in anti-oxidatively effective amount N-(n-tetradecyl) - N - methyl - N - [(2 - hydroxy - 1,1 - bis-hydroxymethyl)ethyl]amine.

18. A material normally subject to deterioration by oxidation containing as an antioxidant ingredient in anti-oxidatively effective amount an hydroxylated-N-alkylated amine of the formula:

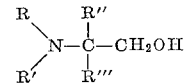

where R represents hydrogen or lower-alkyl, R' represents alkyl containing from ten to eighteen carbon atoms, R'' and R''' each represent lower-alkyl or hydroxymethyl, and the sum of the number of carbon atoms in R, R', R'', and R''' is between thirteen and twenty-six, inclusive.

19. A material normally subject to deterioration by oxidation containing as an antioxidant ingredient in anti-oxidatively effective amount a compound of the formula:

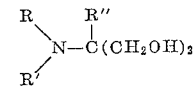

where R and R'' represent lower-alkyl, R' represents alkyl, and the sum of the number of carbon atoms in R, R', and R'' is between twelve and twenty-four, inclusive.

20. A material normally subject to deterioration by oxidation containing as an antioxidant ingredient in anti-oxidatively effective amount a compound of the formula:

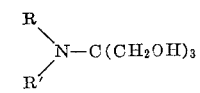

where R represents lower-alkyl, R' represents alkyl, and the sum of the number of carbon atoms in R and R' is between eleven and twenty-two, inclusive.

21. A material normally subject to deterioration by oxidation containing as an antioxidant ingredient in anti-oxidatively effective amount N - (n - dodecyl) - N-methyl - N - [(2 - hydroxy - 1 - hydroxymethyl - 1 - methyl)ethyl]amine.

22. A material normally subject to deterioration by oxidation containing as an antioxidant ingredient in anti-oxidatively effective amount N - (n - tetra - decyl) - N-methyl - N - [(2 - hydroxy - 1 - hydroxymethyl - 1 - methyl)ethyl]amine.

23. A material normally subject to deterioration by oxidation containing as an antioxidant ingredient in anti-oxidatively effective amount N - (n - dodecyl) - N-methyl - N - [(2 - hydroxy - 1,1 - bis - hydroxymethyl) ethyl]amine.

24. A material normally subject to deterioration by oxidation containing as an antioxidant ingredient an anti-oxidatively effective amount N - (n - tetra - decyl) - N-methyl - N - [(2 - hydroxy - 1,1 - bis - hydroxymethyl) ethyl]amine.

References Cited
UNITED STATES PATENTS

| | | | |
|---|---|---|---|
| 2,885,441 | 5/1959 | Zenitz | 260—584 |
| 3,208,859 | 9/1965 | Coffield | 252—401 X |
| 3,259,511 | 7/1966 | Rairon et al. | 252—401 X |

LEON D. ROSDOL, *Primary Examiner.*

M. WEINBLATT, *Assistant Examiner.*

UNITED STATES PATENT OFFICE
CERTIFICATE OF CORRECTION

Patent No. 3,324,043                        June 6, 1967

Jack K. Krum

It is hereby certified that error appears in the above numbered patent requiring correction and that the said Letters Patent should read as corrected below.

Column 3, line 6, for "$CH_2HO]$" read -- $CH_2OH]$ --; line 75, for "filtration" read -- filtration, --; columns 3 and 4, Table I, fifth column, line 4 thereof, for "55.4   57.6° C" read -- 55.4-57.6° C. --; column 7, line 10, the formula shoul appear as shown below instead of as in the patent:

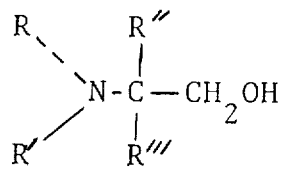

Signed and sealed this 1st day of April 1969.

(SEAL)
Attest:

EDWARD M. FLETCHER, JR.                  EDWARD J. BRENNER
Attesting Officer                          Commissioner of Patents